(12) United States Patent
Hunt et al.

(10) Patent No.: US 6,925,561 B1
(45) Date of Patent: Aug. 2, 2005

(54) RADIO COMMUNICATION SYSTEM

(75) Inventors: Bernard Hunt, Redhill (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 942 days.

(21) Appl. No.: 09/689,055

(22) Filed: Oct. 12, 2000

(30) Foreign Application Priority Data

Nov. 3, 1999 (GB) .............................................. 9925896

(51) Int. Cl.$^7$ ............................ H04K 1/10; H04L 1/00; H04J 13/02; H04B 7/216; H04B 1/69
(52) U.S. Cl. ...................... 713/169; 713/176; 370/312; 370/335; 375/140; 375/146
(58) Field of Search ................................ 375/134, 145, 375/148; 713/169, 180

(56) References Cited

U.S. PATENT DOCUMENTS 4,641,322 A * 2/1987 Hasegawa .................... 375/145
6,181,729 B1 * 1/2001 O'Farrell ..................... 375/130

FOREIGN PATENT DOCUMENTS

EP          1037481 A1    9/2000    ............ H04Q/7/32

* cited by examiner

Primary Examiner—Gregory Morse
Assistant Examiner—Matthew Heneghan
(74) Attorney, Agent, or Firm—Dicran Halajian

(57) ABSTRACT

A radio communication system has a random access channel for the transmission of data from a secondary station to a primary station while the secondary station is not engaged in a call. A secondary station wishing to use a random access channel resource transmits a preamble encoded with a signature corresponding to the required resource. In response the primary station can transmit a positive acknowledgement (ACK) corresponding to the received preamble, indicating that a channel is available, or a negative acknowledgement (NACK), indicating that the resource is not available. A first set of signatures are used to encode ACKs and a second set of signatures are used to encode NACKs. The two sets of signatures have the property that no signature in one set is the inverse of a signature in the other set, thereby avoiding the possibility of simultaneously transmitting an ACK and a NACK with signatures that are the inverse of one another.

10 Claims, 3 Drawing Sheets

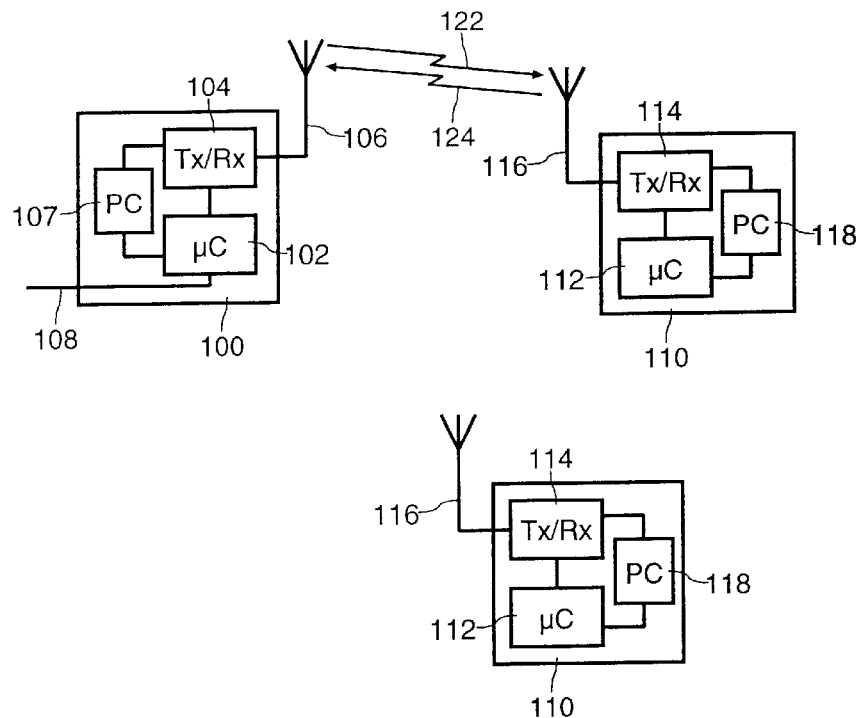

FIG. 1

| S | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ |
|---|---|---|---|---|---|---|---|---|---|---|---|---|---|---|---|---|
| 1 | A | A | A | -A | -A | -A | A | -A | -A | A | A | -A | A | -A | A | A |
| 2 | -A | A | -A | -A | A | A | A | -A | A | A | A | -A | -A | A | -A | A |
| 3 | A | -A | A | A | A | -A | A | A | -A | A | A | A | -A | A | -A | A |
| 4 | -A | A | -A | A | -A | -A | -A | -A | -A | A | -A | A | -A | A | A | A |
| 5 | A | -A | -A | -A | -A | A | A | -A | -A | -A | -A | A | -A | -A | -A | A |
| 6 | -A | -A | A | -A | A | -A | A | -A | A | -A | A | A | A | A | A | A |
| 7 | -A | A | A | -A | -A | A | A | A | -A | -A | -A | -A | -A | -A | -A | A |
| 8 | A | A | -A | -A | -A | -A | -A | A | A | -A | A | A | A | -A | A | A |
| 9 | A | -A | A | -A | -A | A | -A | A | A | A | -A | -A | -A | A | A | A |
| 10 | -A | A | A | -A | A | A | -A | A | -A | -A | A | A | -A | -A | A | A |
| 11 | A | A | A | A | A | A | -A | -A | A | A | -A | A | A | -A | -A | A |
| 12 | A | A | -A | A | A | A | A | -A | -A | A | -A | -A | A | A | A | A |
| 13 | A | -A | -A | A | A | -A | -A | -A | A | -A | A | -A | -A | -A | A | A |
| 14 | -A | -A | -A | A | -A | A | A | A | A | A | A | A | -A | A | A | A |
| 15 | -A | -A | -A | -A | A | -A | A | A | -A | A | -A | -A | A | -A | -A | A |
| 16 | -A | -A | A | A | -A | A | -A | -A | -A | -A | A | -A | A | A | -A | A |

FIG. 3

RADIO COMMUNICATION SYSTEM

The present invention relates to a radio communication system having a random access channel for the transmission of data from a secondary station to a primary station, and further relates to primary and secondary stations for use in such a system and to a method of operating such a system. While the present specification describes a system with particular reference to the emerging Universal Mobile Telecommunication System (UMTS), it is to be understood that the techniques described are equally applicable to use in other mobile radio systems. In this specification the term random access channel refers to the logical channel on which random access transmissions take place, which would typically consist of a number of distinct physical channels.

A random access channel is a normal component of a radio communication system, enabling a Mobile Station (MS) to send short messages to a Base Station (BS). Applications include signalling to the BS when the MS is turned on, sending a packet of data to the BS when the MS may not be engaged in a call, and requesting the BS to allocate a resource for the MS to use.

In a system where mobile stations often have a requirement to send packets of data to the BS when not actually engaged in a call it is advantageous to provide a random access packet channel with similar characteristics to a standard random access channel but intended for the transmission of small and medium sized packets from a MS to the BS.

In an embodiment of a such a scheme developed for UMTS, there are a number of random access packet channels available to a MS. There are a number of identifying signatures allocated for requesting resources, each of which corresponds to either a predetermined bit rate (for which the BS will attempt to allocate a suitable channel) or a particular channel having a predetermined bit rate. A MS wishing to obtain access to a packet channel sends a request for access encoded with a signature chosen at random from those corresponding to the required resource, the access request being transmitted in a defined time slot using a slotted aloha scheme. The MS then listens for one of three possible responses:

1. a positive acknowledgement (ACK) corresponding to the chosen signature, indicating that the MS should proceed to a contention resolution phase (to ensure that only one MS gains access to the selected channel);
2. no response encoded using the chosen signature, in which case the MS makes another access attempt at a higher power level in the next available slot (unless it has already reached the maximum power level or maximum number of retries); or
3. a negative acknowledgement (NACK) corresponding to the chosen signature, indicating that the MS is not accepted and should not continue to attempt access until the expiry of a backoff period. A NACK is normally defined to be the inverse of the positive ACK.

In a variation of this scheme, where a MS requests a bit rate rather than a particular channel, a NACK corresponding to each individual signature to be denied access is not sent. Instead one signature is chosen to represent a bit rate. Hence a single NACK can be used to indicate that a particular bit rate is not available, thereby reducing both power consumption and interference levels compared to signalling lack of availability of several channels.

A BS may wish to broadcast an ACK, encoded with a signature corresponding to the signature of the successful request, while at the same time broadcasting NACKs to other signatures requesting the same bit rate as the channel being allocated to the successful request. A problem with this approach is it may be required to send an ACK and a NACK corresponding to the same signature. This requires transmission of a signal and its exact inverse, which cancel each other out and result in no information being transmitted.

An object of the present invention is to provide an improved acknowledgement scheme for a random access channel.

According to a first aspect of the present invention there is provided a radio communication system having a random access channel for the transmission of data from secondary stations to a primary station, the secondary stations having means for requesting access to random access channel resources and the primary station having means for transmitting in response at least one of an acknowledgement signal encoded with a first signature and a rejection signal encoded with a second signature, both signals being able to be transmitted at substantially the same time, and the signatures available for encoding the signals being partitioned into first and second sets in such a way that neither set contains a signature that is the inverse of a signature in the other set, the first signature being selected from the first set and the second signature from the second set.

According to a second aspect of the present invention there is provided a primary station for use in a radio communication system having a random access channel for the transmission of data from secondary stations to the primary station, wherein means are provided for receiving requests from secondary stations for access to random access channel resources and for transmitting in response at least one of an acknowledgement signal encoded with a first signature and a rejection signal encoded with a second signature, both signals being able to be transmitted at substantially the same time, and the signatures available for encoding the signals being partitioned into first and second sets in such a way that neither set contains a signature that is the inverse of a signature in the other set, the first signature being selected from the first set and the second signature from the second set.

According to a third aspect of the present invention there is provided a secondary station for use in a radio communication system having a random access channel for the transmission of data to a primary station, wherein means are provided for requesting access to a random access channel resource and for receiving from the primary station at least one of an acknowledgement signal encoded with a first signature and a rejection signal encoded with a second signature, both signals being able to be transmitted at substantially the same time, and the signatures available for encoding acknowledgement and rejection signals being partitioned into first and second sets in such a way that neither set contains a signature that is the inverse of a signature in the other set, the first signature being selected from the first set and the second signature from the second set.

According to a fourth aspect of the present invention there is provided a method of operating a radio communication system having a random access channel for the transmission of data from secondary stations to a primary station, the method comprising at least one of the secondary stations requesting access to random access channel resources and the primary station transmitting in response at least one of an acknowledgement signal encoded with a first signature and a rejection signal encoded with a second signature, both signals being able to be transmitted at substantially the same time, and the signatures available for encoding the signals being partitioned into first and second sets in such a way that neither set contains a signature that is the inverse of a signature in the other set, the first signature being selected from the first set and the second signature from the second set.

Embodiments of the present invention will now be described, by way of example with reference to the accompanying drawings, wherein:

FIG. 1 is a block schematic diagram of a radio communication system;

FIG. 3 is a table showing one possible set of 16 preamble signatures;

In the drawings the same reference numerals have been used to indicate corresponding features.

Figure 2:
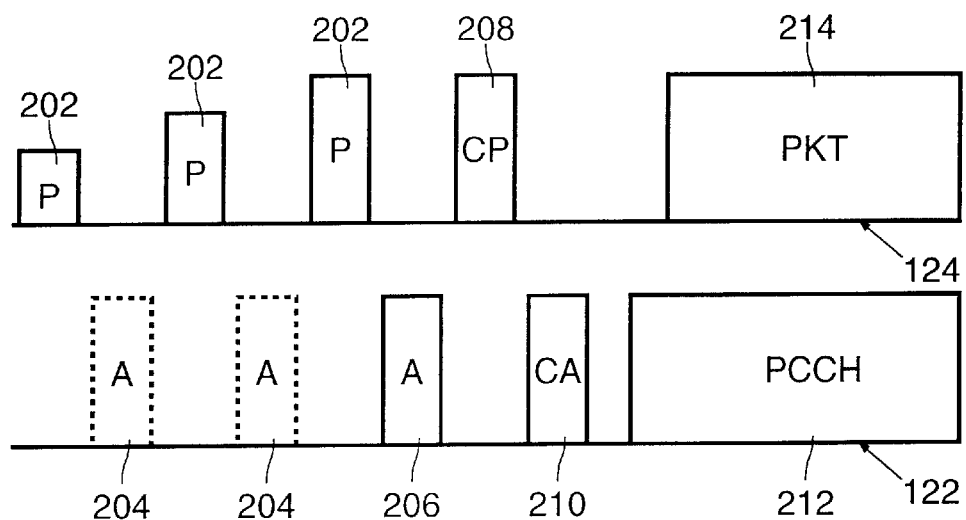
FIG. 2 illustrates a basic random access packet channel scheme.

Referring to FIG. 1, a radio communication system comprises a primary station (BS) 100 and a plurality of secondary stations (MS) 110. The BS 100 comprises a microcontroller ($\mu$C) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller ($\mu$C) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

A basic scheme for a random access packet channel operating in a frequency division duplex system is shown in FIG. 2, with the uplink channel 124 drawn above the downlink channel 122. In an access phase, the MS 110 first transmits a preamble (P) 202, encoded with a signature corresponding to the requested channel, at a low power level in a particular access slot.

A signature is a signal characterised by its scrambling code and channelisation code modulated by a specific bit sequence. A mutually orthogonal set of signatures can be obtained by defining a set of mutually orthogonal bit sequences for the modulation. One example of such a set is shown in FIG. 3, the set comprising 16 signatures $P_0$ to $P_{15}$. Each signature P, comprises 16 complex symbols S, each of which is either A or $-A$, where $A=1+j$. The inverse of each signature is obtained by interchanging A and $-A$. The signatures and their inverses are all mutually orthogonal, with the exception that a signature is not orthogonal to its inverse.

A different set of signatures can be obtained by changing the scrambling code or the channelisation code (i.e. the physical channel), or by using a different mutually orthogonal set of bit sequences. Alternatively a larger set of signatures may be defined in such a way as to have low cross correlations, rather than strict orthogonality. Although the present specification refers to sets of 16 signatures different implementations may use sets having different numbers of signatures.

In this basic scheme the choice of preamble signature for encoding the access preamble 202 determines the physical channel requested by the MS 110. In one embodiment of the scheme the MS 110 chooses a channel, with its corresponding signature, at random. However, it is preferable for each signature to correspond to one of a predetermined set of available bit rates. This avoids the problem of the MS 110 being denied access by requesting a channel that is in use while other suitable channels are available. If there is more than one signature corresponding to the required bit rate the MS 110 chooses one of them, either at random or in a predetermined manner.

If the BS 100 receives and decodes the preamble correctly it can transmit a preamble acknowledgement (A) 206 corresponding to the received preamble. This is transmitted unless the BS 100 wishes the MS 110 to attempt access again in the next available slot. In the example shown in FIG. 2, after the first preamble 202 is transmitted no acknowledgement is returned in the slot 204 allocated for it (which might typically be 1 ms in length). The MS 110 therefore transmits another preamble 202 at a higher power level. Again no acknowledgement is received in the slot 204, so the MS 110 transmits another preamble 202 at a still higher power. This is received and decoded by the BS 100, which transmits an acknowledgement 206 and thereby completes the access phase.

As well as informing the MS 110 that its preamble 202 has been received, the acknowledgement 206 may be a positive acknowledgement (ACK), to signal that the requested channel is free and that the MS 110 should proceed to the contention resolution phase, or a negative acknowledgement (NACK), to signal that access is denied to the MS 110. A single NACK can advantageously be used to indicate that a group of channels, corresponding to one particular bit rate, is not available. For example, if the BS 100 receives three preambles encoded with different signatures each requesting access to a 960 kbps (kilo bits per second) channel but only one such channel is available the BS 100 sends an ACK corresponding to one of the preambles and also broadcasts a NACK indicating that the other access attempts have failed. Broadcast of a NACK corresponding to a particular bit rate also has the advantage that it indicates to any other MS 110 which may be about to request such a bit rate that it is not available. A further use of a NACK corresponding to a group of channels is that if a large number of access preambles 202 are transmitted which the BS 100 is unable to service (for reasons other than lack of a suitable channel), the BS 100 can broadcast a NACK corresponding to this group of channels to prevent each MS 110 retransmitting an access preamble 202 at a higher power in the next slot.

The BS 100 will only transmit one acknowledgement for each access slot, irrespective of however many preambles 202 were transmitted. One basis for the selection could be to acknowledge the preamble 202 received with the highest power. If more than one preamble 202 was transmitted but each preamble was encoded with a different signature then each MS 110 will know whether or not its preamble 202 was received correctly. However, it is possible that more than one MS 110 selected the same signature, and therefore believes that its preamble 202 has been received. If each of these mobile stations 110 begins to transmit its data the result will be a collision, with none of the data likely to be received correctly.

To reduce the chances of this happening, a contention resolution phase may follow the transmission of an acknowledgement 206 which indicated that the requested resource was free. Each MS 110 which transmitted a preamble 202 encoded with a signature corresponding to that positively acknowledged by the BS 100 now transmits a further contention resolution preamble (CP) 208. This preamble 208 is encoded with a signature randomly selected from another set of 16 possible signatures. This set may be different from the set used for the access preamble 202 (either by changing the set of modulating bit sequences, the scrambling code or the channelisation code), or alternatively the set of signatures may be shared between access and contention resolution phases. The BS 100 then issues a contention resolution acknowledgement (CA) 210 corresponding to the selected preamble 208, for example that received with the highest power, and also issues channel assignment information, which enables the MS 110 to transmit its data. Hence, if more than one MS 110 selected the same access preamble 202 the chance of the same contention resolution preamble 208 also being selected is small.

The access procedure described above, comprising access and contention resolution phases, is one form of Digital Sense Multiple Access with Collision Detection (DSMA-CD). After the contention resolution phase the BS 100 begins transmission of a Physical Control CHannel (PCCH) 212, which includes power control information to instruct the MS 110 to adjust its transmission power as necessary, and the MS 110 transmits one or more data packets (PKT) 214 on the allocated packet channel, which is normally on a different physical channel to those used for the preamble transmissions. The PCCH 212 may begin simultaneously with the transmission of the data 214, or may precede it sufficiently for closed loop power control to be established before the data transmission.

Figure 4:
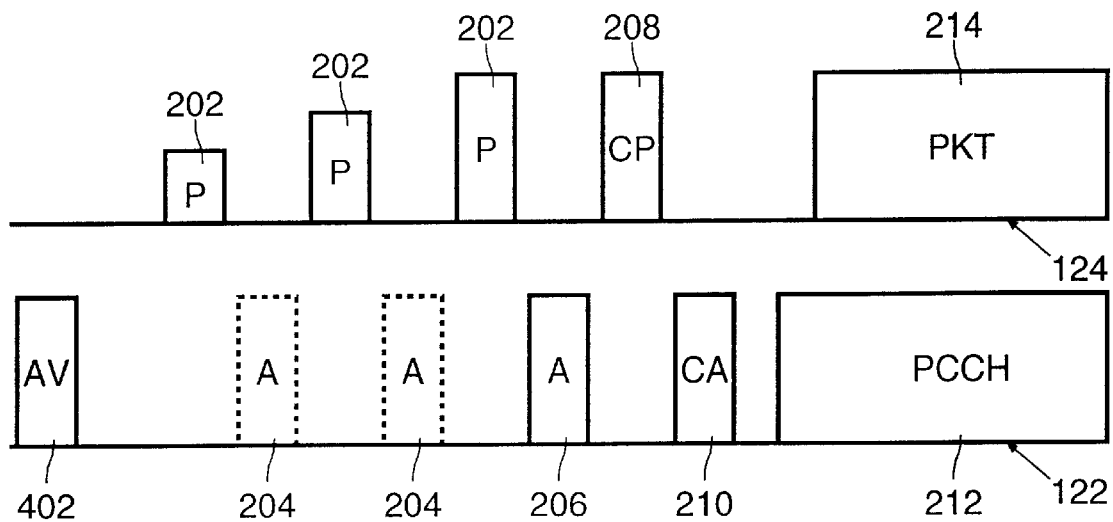
FIG. 4 illustrates an enhanced random access packet channel scheme having a packet channel availability message.

A modified scheme is illustrated in FIG. 4, where the BS 100 also transmits an availability (AV) message 402 to enable a MS 110 to determine whether its required channel or bit rate is available before requesting access. Such a scheme reduces interference by avoiding a MS 110 making an access attempt that cannot succeed. A radio communication system incorporating such a scheme is disclosed in more detail in our co-pending UK patent application 9921548.5 (our reference PHB 34390).

As discussed above, the possibility of the BS 100 broadcasting a NACK (indicating that a bit rate is not available) at the same time as it transmits an ACK to one or more MSs 110 improves efficiency and reduces interference in the system. However, in known systems the signature used to encode an ACK is the same as the signature used to encode the access preamble 202 which it is acknowledging, while the signature used to encode a NACK is chosen to be the inverse of one signature chosen to represent the group of channels. In such known systems an ACK encoded with a particular signature may be transmitted at the same time as a NACK encoded with the inverse of that signature, with the result that the two transmissions cancel out. Such a result leads to delays and extra interference (since each MS 110 that transmitted an access preamble 202 which should have received an acknowledgement 204 will retransmit its preamble 202 at a higher power level).

In a system made in accordance with the present invention such a problem is avoided by modifying the signature used to encode an ACK so that it is no longer necessarily the same as that used to encode the preamble 202. For example, in a system having 16 signatures P0 to P15 available, instead of allocating all 16 signatures for ACKs, 8 signatures and their inverses are allocated. Hence, one possible mapping between the signatures encoding the access preambles 202 and those encoding the ACKs is:

| Preamble Signature | ACK Signature |
| --- | --- |
| $P_0$ | $P_0$ |
| $P_1$ | $P_1$ |
| $P_2$ | $P_2$ |
| $P_3$ | $P_3$ |
| $P_4$ | $P_4$ |
| $P_5$ | $P_5$ |
| $P_6$ | $P_6$ |
| $P_7$ | $P_7$ |
| $P_8$ | $-P_0$ |
| $P_9$ | $-P_1$ |
| $P_{10}$ | $-P_2$ |
| $P_{11}$ | $-P_3$ |
| $P_{12}$ | $-P_4$ |
| $P_{13}$ | $-P_5$ |
| $P_{14}$ | $-P_6$ |
| $P_{15}$ | $-P_7$ |

The remaining signatures, or their inverses (but not both), can be allocated for use by NACKs corresponding to a particular bit rate. For example, in one UMTS embodiment there are seven possible bit rates, which could have corresponding NACK signatures according to the following scheme:

| Data Rate (kbps) | NACK Signature |
| --- | --- |
| 15 | $P_8$ |
| 30 | $P_9$ |
| 60 | $P_{10}$ |
| 120 | $P_{11}$ |
| 240 | $P_{12}$ |
| 480 | $P_{13}$ |
| 960 | $P_{14}$ |

The signature allocation scheme described above is efficient and overcomes the problem of signature cancellation since the inverses of the signatures used to transmit NACKs are never used to transmit an ACK. It will to be apparent that a range of alternative allocation schemes in accordance with the present invention could readily be determined, each having this property.

Figure 5:
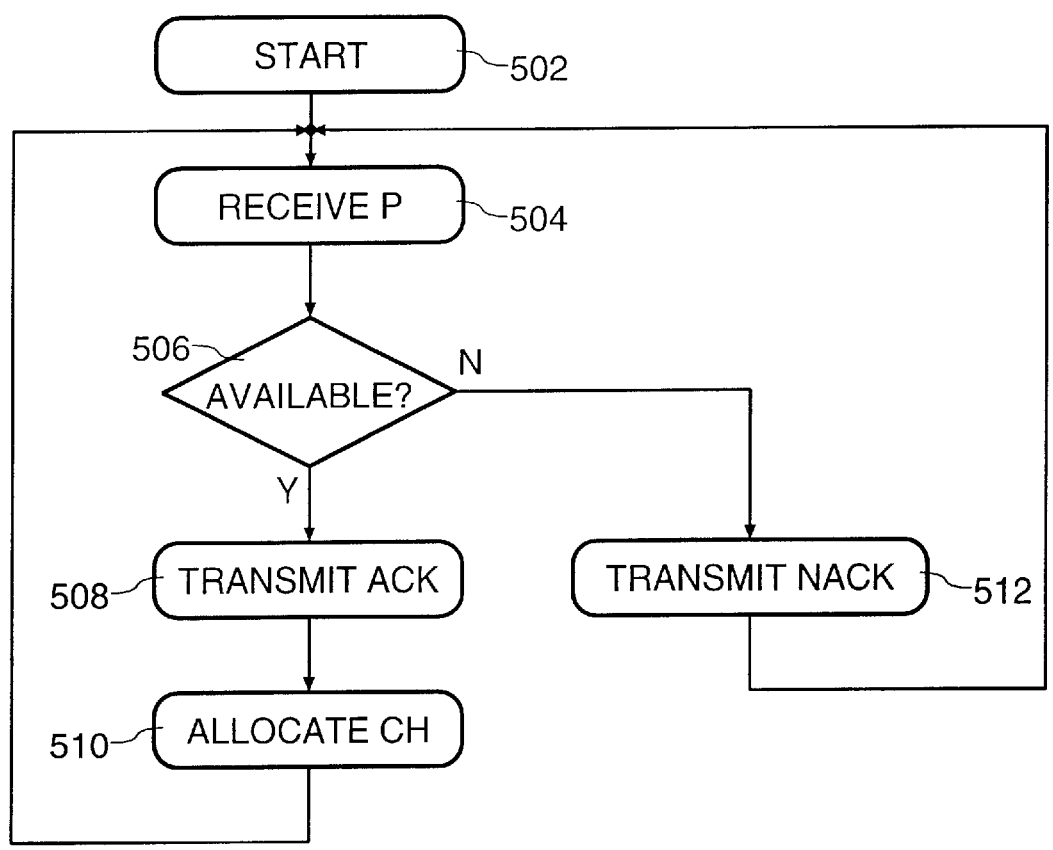
FIG. 5 is a flow chart illustrating a method in accordance with the present invention for acknowledging access attempts for a random access packet channel.

A flow chart summarising a method in accordance with the present invention for providing ACKs and NACKs in response to access attempts by MSs 110 is shown in FIG. 5. The method starts, at 502, with the BS 100 listening for the transmission of one or more access preambles 202 by a MS 110 having data for transmission on the random access packet channel. The BS 100 receives, at 504, the access preamble 202 from one MS 110 and determines, at 506, whether a channel providing the requested bit rate can be assigned. If it is the BS 100 transmits, at 508, an ACK encoded with a signature selected as described above and then proceeds, at 510, with the remainder of the access procedure after which the method returns to step 504 to receive and process further access preambles 202. If no suitable channel can be assigned, the BS 100 transmits, at 512, a NACK encoded with a signature selected as described above, and returns to step 503 to receive and process further access preambles 202.

The flow chart of FIG. 5 only shows the processing of a single access preamble 202. If several preambles 202 are received at the same time the processing of each can proceed in parallel, with the BS 100 determining the combination of ACKs and NACKs to be transmitted in response to the complete set of preambles 202 received and the availability of channels.

As well as its application in a FDD system as described above, the present invention could be applied in other types of communication system. For example, it could be used in a Time Division Multiple Access (TDMA) system provided that the uplink transmissions take place in different time slots to the downlink transmissions.

The embodiments described above relate to packet transmission. However, the same principles can equally well be applied to a system in which circuits are set up for data transmission.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A radio communication system having a random access channel for the transmission of data from secondary stations to a primary station, the secondary stations having means for requesting access to random access channel resources and the primary station having means for transmitting in response at least one of an acknowledgement signal encoded with a first signature and a rejection signal encoded with a second signature, both signals being able to be transmitted at substantially the same time, and the signatures available for encoding the signals being partitioned into first and second sets in such a way that neither set contains a signature that is the inverse of a signature in the other set, the first signature being selected from the first set and the second signature from the second set.

2. A system as claimed in claim 1, characterised in that the random access channel is adapted for transmission of data in packets.

3. A primary station for use in a radio communication system having a random access channel for the transmission of data from secondary stations to the primary station, wherein means are provided for receiving requests from secondary stations for access to random access channel resources and for transmitting in response at least one of an acknowledgement signal encoded with a first signature and a rejection signal encoded with a second signature, both signals being able to be transmitted at substantially the same time, and the signatures available for encoding the signals being partitioned into first and second sets in such a way that neither set contains a signature that is the inverse of a signature in the other set, the first signature being selected from the first set and the second signature from the second set.

4. A primary station as claimed in claim 3, characterised in that the first set of signatures comprises a plurality of signatures and their inverses.

5. A primary station as claimed in claims 3 or 4, characterised in that the second set of signatures does not include both a signature and its inverse.

6. A secondary station for use in a radio communication system having a random access channel for the transmission of data to a primary station, wherein means are provided for requesting access to a random access channel resource and for receiving from the primary station at least one of an acknowledgement signal encoded with a first signature and a rejection signal encoded with a second signature, both signals being able to be transmitted at substantially the same time, and the signatures available for encoding acknowledgement and rejection signals being partitioned into first and second sets in such a way that neither set contains a signature that is the inverse of a signature in the other set, the first signature being selected from the first set and the second signature from the second set.

7. A secondary station as claimed in claim 6, characterised in that the means for requesting access to a random access channel resource comprises means for transmitting a signal encoded with a signature corresponding to the resource.

8. A method of operating a radio communication system having a random access channel for the transmission of data from secondary stations to a primary station, the method comprising at least one of the secondary stations requesting access to random access channel resources and the primary station transmitting in response at least one of an acknowledgement signal encoded with a first signature and a rejection signal encoded with a second signature, both signals being able to be transmitted at substantially the same time, and the signatures available for encoding the signals being partitioned into first and second sets in such a way that neither set contains a signature that is the inverse of a signature in the other set, the first signature being selected from the first set and the second signature from the second set.

9. A method as claimed in claim 8, characterised by the resource comprising any channel supporting a particular bit rate.

10. A method as claimed in claim 8 or 9, characterised by the first set of signatures comprising a plurality of signatures and their inverses and by the second set of signatures not including both a signature and its inverse.

* * * * *